United States Patent [19]
Preisler

[11] 3,935,445
[45] Jan. 27, 1976

[54] SOCKET MOUNTING STRUCTURE FOR VEHICLE LIGHTS

[75] Inventor: James Michael Preisler, Minneapolis, Minn.

[73] Assignee: Drag Specialties, Inc., Edina, Minn.

[22] Filed: Mar. 4, 1974

[21] Appl. No.: 447,944

[52] U.S. Cl. .............................. 240/7.1 R; 240/8.3
[51] Int. Cl.² .......................................... B60Q 1/30
[58] Field of Search ................ 240/7.1 R, 8.3, 106.1

[56] References Cited
UNITED STATES PATENTS

| | | | |
|---|---|---|---|
| 3,059,104 | 10/1962 | Dickson | 240/8.3 |
| 3,115,307 | 12/1963 | Dickson | 240/8.3 |
| 3,118,616 | 1/1964 | Magazanik | 240/7.1 R |
| 3,125,299 | 3/1964 | Woofter et al. | 240/7.1 R |
| 3,127,117 | 3/1964 | Mappes | 240/8.3 |
| 3,143,301 | 8/1964 | Trautner et al. | 240/7.1 R X |
| 3,145,933 | 8/1964 | Dickson | 240/8.3 X |
| 3,226,537 | 12/1965 | Hanson et al. | 240/106.1 X |
| 3,327,110 | 6/1967 | Baldwin | 240/8.3 |
| 3,488,626 | 1/1970 | Koerper et al. | 240/7.1 R |
| 3,819,926 | 6/1974 | Hess | 240/7.1 R |

Primary Examiner—L. T. Hix
Assistant Examiner—Alan Mathews
Attorney, Agent, or Firm—Williamson, Bains & Moore

[57] ABSTRACT

A vehicle light, in particular a motorcycle taillight, having a housing with a light bulb and its socket assembly completely enclosed therein. One side of the housing is normally closed by a lens plate which can be removed to permit the removable installation of the socket assembly within the housing by forcing a base plate of the socket assembly between a pair of closely spaced retention members in a friction fit therewith. A wall of the housing opposite the lens side of the housing is completely flat and has apertures therein to permit the flush mounting of the light against a portion of a vehicle.

10 Claims, 5 Drawing Figures

SOCKET MOUNTING STRUCTURE FOR VEHICLE LIGHTS

BRIEF SUMMARY OF THE INVENTION

This invention is directed to a light, primarily intended for use on vehicles, which is particularly characterized by the completely enclosed and protected mounting of a light bulb socket assembly within a housing adapted for flush mounting on a support device on a vehicle.

These basic advantages are accomplished by providing a solid housing having an access opening on one side thereof which is normally covered by a removable lens and a flat mounting wall on the opposite side thereof through which mounting apertures for fasteners extend. A light bulb socket assembly is removably held and contained within the housing between fixed retention means inside of the housing and a hold-down element projecting from the inside face of the lens. With the socket assembly completely contained within the housing, it is protected from the corrosive effects of weather, as well as from damage by foreign objects.

In a preferred embodiment of the invention, the aforesaid fixed retention means for the socket assembly comprises a pair of closely spaced retention members projecting inwardly from the inside face of the flat mounting wall of the housing towards the access opening side; and the socket assembly includes a base plate to which a bulb socket is secured, the base plate being removably inserted between the aforesaid retention members in light, frictional engagement therewith. With the lens plate removed, the socket assembly can be readily removed through the access opening side of the housing by pulling it outwardly from the retention members. The hold-down element on the inside face of the lens plate is of a predetermined length such that it will firmly bear against one edge of the socket base plate to assist in holding it in place when the lens plate is secured to the housing over the access opening.

The aforesaid socket assembly is further secured in place against displacement or vibration within the housing by a pair of elongated ribs extending transversely of the housing between the lens side and the oppositely disposed flat, mounting wall, the base plate of the socket assembly being snuggly contained between said ribs. The aforesaid ribs are spaced apart adjacent opposite walls of the housing, and advantageously serve a dual function by being tapped on their outer ends adjacent to said access opening side of the housing to receive threaded fasteners utilized to removably attach the lens to the housing.

These and other objects and advantages of my invention will become readily apparent as the following description is read in conjunction with the accompanying drawings wherein like reference numerals have been used to designate like elements throughout the several views.

DESCRIPTION OF THE PREFERRED EMBODIMENTS

Figure 1:
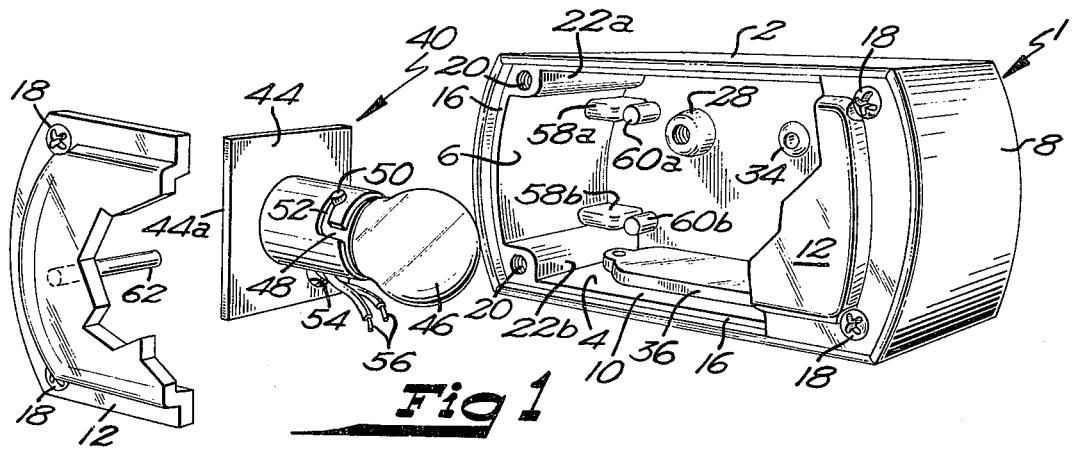
FIG. 1 is a perspective view of the light of this invention, showing parts thereof in exploded relation to the light housing.

Referring now to the drawings, I have shown in FIGS. 1 through 4 a preferred form of the light structure of this invention. A solid housing for the light, generally indicated by reference numeral 1, defines an enclosure within which a light bulb and its associated socket assembly is completely contained. Housing 1 may obviously take various forms. For illustrative purposes, I have shown a commercial embodiment of the light structure having a generally rectangular shaped housing 1 with top and bottom walls 2, 4, and arcuate end walls 6, 8. One side of housing 1 has an access opening 10 therein which is defined by the adjacent edges of top and bottom walls 2, 4 and side walls 6, 8. Access opening 10 of housing 1 is normally closed by a lens plate 12 removably attached to housing 1 in covering relation to the access opening. On the opposite side of housing 1 from access opening 10 and lens plate 12 is a planar mounting wall 14 which is flat over its entire surface. This permits the flush mounting of housing 1 on a vehicle utilizing attachment means for fasteners hereinafter set forth.

Extending completely around the periphery of open face 10 of housing 1 is a shoulder 16 against which lens plate 12 is seated. Lens plate 12 is removably attached to housing 1 by means of threaded fasteners 18 extending therethrough into outer, threaded apertures 20 formed in four corner ribs on the inside of housing 1. These ribs, only three of which are shown at 22a, 22b and 22c, are formed integrally with housing 1, which is preferably die cast zinc. As is illustrated with respect to ribs 22a and 22b, these ribs extend transversely of housing 1 between the open, lens side thereof and opposite mounting wall 14 in a direction generally perpendicular to the plane of access opening 10. The outer ends of these elongated ribs are tapped to provide threaded apertures 20 adjacent to lens side opening 10 to receive screws 18 after lens plate 12 is positioned over opening 10 in seating shoulder 16.

It is to be noted that in the embodiment of the vehicle light shown in FIGS. 1 through 4, the light structure is designed for use as a taillight — brake light combination on a vehicle, with lens plate 12 also functioning as a reflector.

For the purpose of mounting housing 1 on a bracket or support structure on a vehicle, mounting wall 14 is provided with a pair of threaded apertures 24, 26, which preferably extend into and through a pair of mounting bosses 28 and 30 which project inwardly from mounting wall 14 into the interior of housing 1. By virtue of this mounting arrangement, mounting wall 14 is flat over substantially its entire surface, as may be noted with respect to FIG. 3, in order to permit a flush mounting of housing 1 against a mounting bracket or support device on a vehicle of any kind. For example, when used as a tail light, housing 1 may be supported in a flush mounting arrangement directly against the upright bars of a back rest for a motorcycle seat with flat wall 14 abutting against the upright bars of the back rest, or of any other desired support portion of the vehicle. A mounting bracket may be utilized to hold housing 1 in place, with mounting bolts extending through the bracket and into threaded apertures 24, 26 of mounting bosses 28, 30 in mounting wall 14. An additional opening 32 extending through mounting wall 14 and having an insulating grommet 34 therein is used to direct the lead wires from a light source mounted within housing 1 to an external electric connection.

Figure 2:
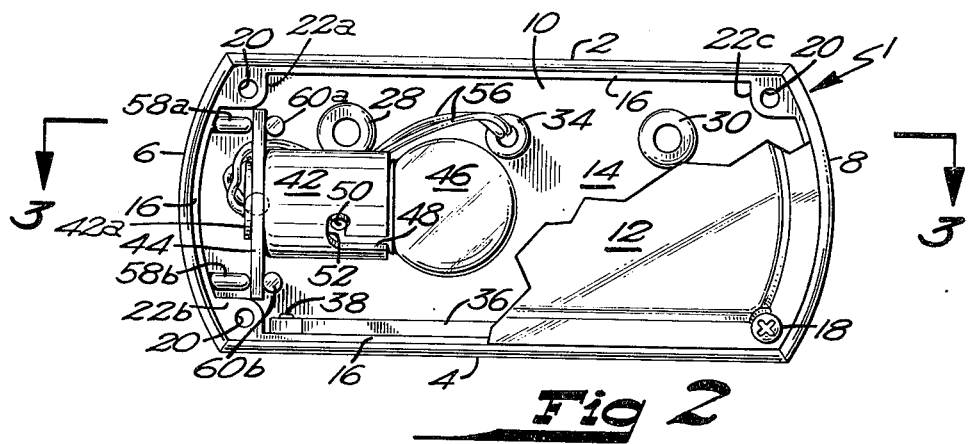
FIG. 2 is a elevation view of the light of FIG. 1 with the lens broken away to show the interior of the housing.

When mounted as a taillight, housing 1 will be oriented generally horizontally as shown in FIGS. 1 and 2 with lens — reflector plate 12 facing rearwardly. A window 36 fastened over an opening in bottom wall 4 of housing 1 by means of screws 38 permits the passage of light from a bulb within housing 1 externally to illuminate a license plate which may be mounted under housing 1.

Figures 3, 4, 5:
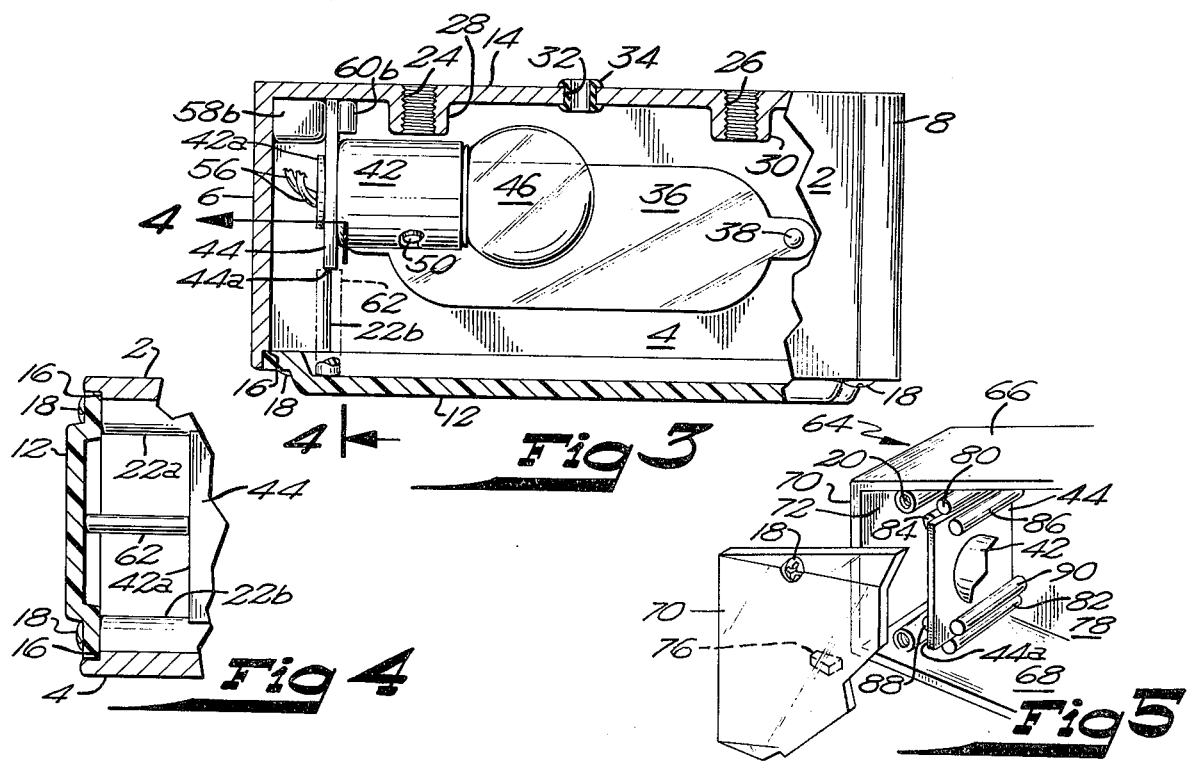
FIG. 3 is a vertical section view of the light taken along lines 3—3 of FIG. 2.
FIG. 4 is a fragmentary, vertical section view taken along lines 4—4 of FIG. 3.
FIG. 5 is a fragmentary, perspective view showing a modified version of the light of this invention.

In FIG. 1 there is shown a light bulb socket assembly generally indicated by reference numeral 40, which is comprised of a bulb socket 42 and a base plate 44. Base end 42a of socket 42 extends through base plate 44 and is securely attached thereto by being crimped over against the rear face of base plate 44, as is indicated in FIGS. 2 and 3. Socket 42 receives a light bulb 46. A conventional bayonet type socket 42 is illustrated, with one or more locating and retaining lugs 50 on bulb base 48 being received within socket slots 52. Slots 52 are so positioned and shaped that as bulb 46 is twisted to lock lugs 50 therein, contacts on the bottom of bulb base 48 will be properly aligned with and in engagement with corresponding contacts in the bottom of socket 42, in a known manner. A combination taillight — stop light socket is preferably used when the light of this invention is employed as a vehicle taillight.

As may best be understood by reference to FIG. 1, socket base plate 44 has a hole 54 therein, through which lead wires 56 from the bottom end of socket 42 may be extended from the rear side of plate 44, forwardly into housing 1. As noted above, lead wires 56 are directed outside of housing 1 through opening 32 in mounting wall 14.

In order to removably secure socket assembly 40 within housing 1, I have provided friction fit retaining means, which may take various forms. In the embodiment illustrated in FIGS. 1 through 4, the retaining means comprisies two pairs of closely spaced retaining members 58a, 60a and 58b, 60 b. Retaining lugs 58a, 58b, as well as retaining pins 60a, 60b protect inwardly into the the interior of housing 1 from points of attachment to mounting wall 14, and are preferably cast integrally therewith. Both pairs of elongated retention members 58a, 60a and 58b, 60b project from wall 14 towards open, lens side 10 of housing 1, so that socket base plate 44 may be placed into housing 1 through access opening 10. One end of base plate 44 is slidably inserted between the closely spaced pairs of retention members 58a, 60a and 58b, 60b, the spacing between these members being predetermined so that they will maintain frictional engagement with the opposite faces of base plate 44 along one end thereof. A light, friction fit between base plate 44 and the two pairs of retention members 58a, 60a and 58b, 60b is preferred, so that plate 77 may be forced therebetween, and removed as desired through access opening 10 by gripping plate 44 and pulling it outwardly from the retention members.

Base plate 44 of the socket assembly is further guided and contained within housing 1 by means of elongated ribs 22a and 22b. These two ribs are spaced apart vertically by a distance substantially equal to the height of base plate 44. Thus, as socket assembly 40 is inserted into housing 1, with base plate 44 oriented vertically as shown in a direction substantially normal to lens plate 12, its opposite longitudinal, top and bottom edges will be slidably received between elongated ribs 22a and 22b. In this manner, ribs 22a and 22b function as positioning and containing members, and restrain base plate 44 against displacement in a direction normal to the direction of longitudinal extent of these ribs.

For the purpose of further tightly securing the socket assembly 40 within housing 1, a hold-down pin 62 is provided on lens plate 12. As may be noted most clearly by reference to FIGS. 1, 3 and 4, hold-down pin 62 is affixed to the inside face of lens plate 12 at a predetermined position and extends inwardly therefrom at substantially right angles with lens plate 12 so that it will be in alignment with base plate 44. Hold-down pin 62 is of a predetermined length such that it will firmly bear against upright edge 44a of base plate 44 facing towards the lens side of housing 1 when lens plate 12 is fastened in place over access opening 10 of housing 1. With lens plate 12 so secured in place, after socket assembly 40 has been positioned within housing 1 in the aforesaid manner, base plate 44 will be firmly held in place between retention members 58a, 60a and 58b, 60b at one end thereof, and hold-down pin 62 bearing against its opposite end. With socket assembly 40 so mounted within housing 1, base plate 44 will extend within a direction substantially normal to lens plate 12. FIG. 4 clearly illustrates the engagement of hold-down pin 62 with outer edge 44a of base plate 44.

Lens plate 12 is made as a molded plastic part. I have found it particularly desirable from a manufacturing and cost standpoint to mold hold-down pin 62 integrally with lens plate 12. This provides a solid attachment of pin 62 to lens plate 12, and permits the accurate controlling of the positioning of pin 62 by the design of the mold.

It will be appreciated that the removable mounting of the entire socket assembly 40 and light bulb 46 completely within housing 1 provides several advantages. First of all, with this type of socket mounting arrangement, there will be no portion of a light socket protruding externally of housing 1, as is normally the case with vehicle lights of known design. In the case of taillights for motorcycles, the light socket has conventionally projected from the wall of a housing, rearwardly opposite the lens face. Since the rear wall through which the socket projected would normally be the mounting wall, it was impossible to obtain a flush mounting. With the socket assembly entirely contained within housing 1, and a completely flat mounting wall 14, it is possible to obtain a tight, flush mounting of housing 1 against an upright support of a vehicle, such as the back rest of a motorcycle, or a fender mounting bracket. Moreover, the internal mounting of socket assembly 40 within housing 1 substantially precludes corrosive damage to the light socket and its contacts from moisture; and since no portion of socket 42 extends outside of housing 1, the possibility of damage to the light socket from foreign objects is substantially eliminated. If it is necessary to replace or clean socket 42, this can be readily accomplished by removing lens plate 12 and pulling socket assembly 40 out of housing 1 by gripping base plate 44. Even the replacement of light bulb 46 can more easily be accomplished by removing socket assembly 40 in this way, since the space for manipulating a light bulb within housing 1 is quite limited.

In FIG. 5 I have shown an alternative embodiment of the vehicle light of this invention. The same structural concept of flush mounting, and entirely, self-contained socket assembly mounting are achieved in this embodiment also. The housing, generally indicated by reference numeral 64 has top and bottom walls 66, 68 and end walls 70 defining an enclosure within which a socket assembly comprised of the same base plate 44 and socket 42 is removably secured. Open side 72 of housing 64 defining an access opening is normally covered by a lens plate 74, secured in place in the same manner as disclosed above with respect to FIGS. 1 through 4. A hold-down lug 76 is provided on the inside face of lens plate 74 and projects inwardly therefrom in the same manner as does hold-down pin 62 of lens plate 12. Attached to a planar, mounting wall 78 and extending therefrom into the inside of the housing are a pair of elongated positioning and containing members in the form of bars 80 and 82 spaced apart vertically by a distance equal to the height of socket base plate 44. These bars 80 and 82 function in the same manner as do elongated ribs 22a and 22b of the housing shown in FIGS. 1 through 4 to position and slidably contain base plate 44. Additionally, first and second pairs of closely spaced retention members 84, 86 and 88, 90 affixed to mounting wall 78 and projecting inwardly therefrom towards the lens side of housing 64 grip and hold socket base plate 44 in a friction fit therewith. Housing 64 is substantially narrower or shallower than is housing 1, and the retention members 84, 86 and 88, 90 as well as positioning bars 80 and 82 extend from mounting wall 78 almost all of the way to the open side 72 of housing 1. In this manner, good frictional engagement of the retention members is achieved on socket base plate 44 along substantially its entire width. When lens plate 74 is attached to housing 1 over open side 72 thereof, hold-down lug 76 affixed thereto bears against the forward edge 44a of socket base plate 44 to assist in holding it firmly in place within housing 1.

Although I have described and shown my improved vehicle light with respect to particular, preferred embodiments thereof, I anticipate that various changes may be made in the size, shape and construction of the light assembly disclosed herein without departing from the spirit and scope of my invention as defined by the following claims.

What is claimed is:

1. A light for external mounting on vehicles comprising:
   a housing having walls defining an enclosure, said enclosure having an access opening on one side thereof;
   a translucent lens removably attached to said housing in covering relation to said access opening;
   a light bulb socket completely contained and enclosed within said housing;
   an opening in a wall of said housing for the passage of lead wires from said socket therethrough;
   a base plate on which said socket is fixedly secured to provide a socket assembly;
   locating and retention means within said housing for holding said socket assembly therein comprising at least one pair of closely spaced retention members secured to the inside of said housing, with said socket base plate held between said retention members in a forced fit therewith; and
   a hold-down element projecting from the inside face of said lens, said hold-down element being of a predetermined length such that it will firmly bear against said socket assembly, thereby securing said socket against displacement in a direction toward said lens side of said housing when said lens is attached thereto.

2. A vehicle light as defined in claim 1 wherein:
   said lens is molded plastic and said hold-down element is molded integrally therewith.

3. A vehicle light as defined in claim 1 wherein:
   said retention members are elongated and extend in friction contact with a portion of the length of said base plate from a wall of said housing opposite said one, lens side thereof, said retention members projecting inwardly from said wall towards said lens side of said housing; and
   said socket base plate is slidably received between said retention members in a friction fit therewith and extends in a direction between said lens side of said housing and said wall to which said retention members are attached, said lens being movable to permit the installation of said socket assembly within said housing by the insertion of said base plate between said retention members.

4. A vehicle light as defined in claim 3 wherein:
   said socket base plate is further retained by a pair of spaced apart, elongated ribs extending transversely of said housing between said lens side and said wall thereof to which said retention members are attached, said base plate being snuggly contained between said ribs with opposite longitudinal edges of said base plate restrained against displacement by said ribs.

5. A light for external mounting on vehicles comprising:
   a housing having walls defining an enclosure, said enclosure having an access opening on one side thereof;
   a light bulb socket completely contained and enclosed within said housing;
   an opening in a wall of said housing for the passage of lead wires from said socket therethrough;
   a base plate on which said socket is fixedly secured to provide a socket assembly, said base plate having opposite longitudinal edges;
   locating and retention means within said housing for holding said socket assembly therein comprising at least one pair of closely spaced retention members secured to the inside of said housing, with said socket base plate held between said retention members in a force fit therewith;
   a pair of spaced apart, elongated ribs extending transversely of said housing perpendicular to said access opening, said base plate being snugly contained between said ribs with said opposite longitudinal edges restrained against displacement by said ribs, said elongated ribs having outer ends adjacent said access opening and said outer ends having threaded apertures defined therein; and
   a translucent lens mounted over said access opening, said lens including threaded fasteners extending therethrough and received within said threaded apertures to removably secure said lens to said housing.

6. A vehicle light comprising:
   a housing having walls defining an enclosure, said housing having an access opening on one side thereof;

a lens removably attached to said housing in covering relation to said access opening;

a socket assembly completely contained and enclosed within said housing, said socket assembly including a bulb receiving socket;

retention means within said housing with which said socket assembly is frictionally engaged in a light, friction fit, whereby said socket assembly may be removably installed within said housing in frictional engagement with said retention means by removing said lens from said one side of said housing; and a hold-down element attached to said lens and projecting inwardly therefrom into said access opening, said hold-down element being of a predetermined length such that it will firmly bear against a portion of said socket assembly when said lens is in place on said housing.

7. A vehicle light as defined in claim 6 wherein:

said socket assembly includes a base plate to which said socket is securely attached, and said base plate is positioned generally perpendicular to said lens side of said housing; and said hold-down element bears against one edge of said base plate when said lens is attached to said housing.

8. A vehicle light as defined in claim 6 wherein:

said socket assembly includes a base plate to which said socket is securely attached; and a pair of elongated positioning and containing members extending transversely of said housing in a direction generally normal to said access opening side of said housing to which said lens is attached, said positioning and containing members being spaced apart by a distance substantially equal to the height of said socket base plate, said base plate being slidably contained between said positioning and containing members against displacement in a direction normal to the direction of longitudinal extent of said containing members.

9. A vehicle light as defined in claim 8, wherein:

said housing has a planar mounting wall on the side thereof opposite said access opening side; and a plurality of mounting apertures in said mounting wall.

10. A vehicle light comprising:

a housing having walls defining an enclosure, said housing having an access opening in one side thereof;

a translucent lens removably attached to said housing in covering relation to said access opening;

a flat mounting wall on the opposite side of said housing from said access opening side, said mounting wall having a plurality of apertures defined therein for receiving fasteners for the flush mounting of said housing against a support portion of a vehicle with said flat mounting wall flush thereagainst, said mounting wall having an inside face;

a socket assembly including a bulb socket completely contained and held within said housing;

fixed retention means within said housing for securing said socket assembly, said retention means comprising a pair of closely spaced retention members between which a portion of said socket assembly is held in frictional engagement therewith, said retention members being secured to the inside face of said flat mounting wall of said housing and projecting inwardly therefrom in a direction toward said access opening;

a hold-down element projecting toward said socket assembly from said lens and abutting said socket assembly to further secure same; and a window extending between said mounting wall and said access opening side of said housing through which light emitted from a bulb in said socket may pass to illuminate a license plate.

* * * * *